No. 12,614. REISSUED MAR. 5, 1907.
G. GLOSSOP.
APPARATUS FOR MAKING AND SHARPENING ROCK DRILLS.
APPLICATION FILED AUG. 19, 1903.
3 SHEETS—SHEET 1.
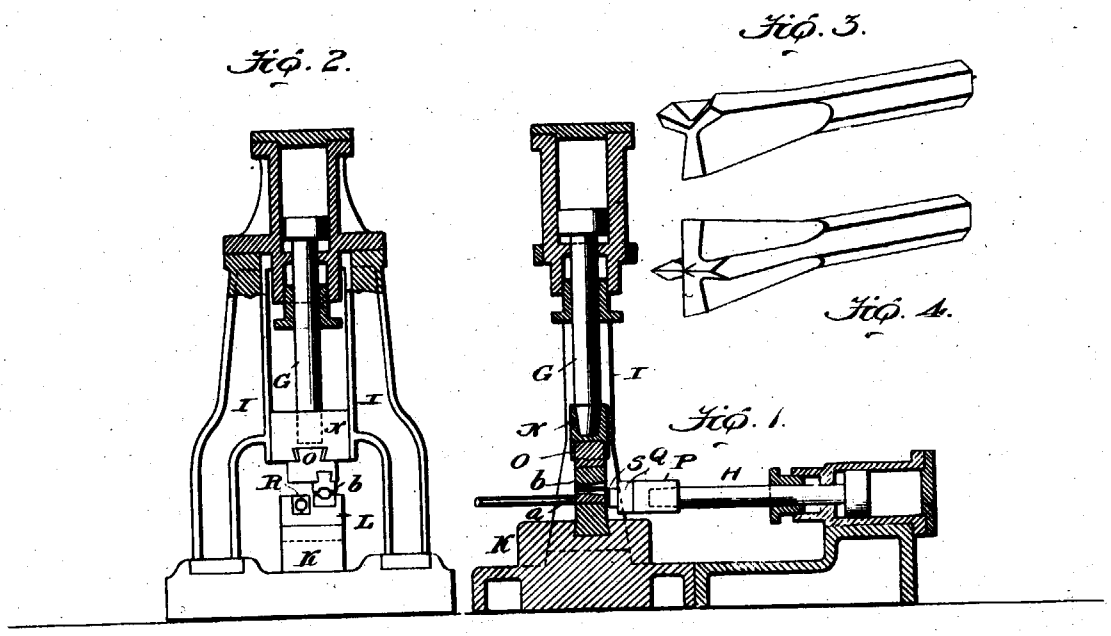
Witnesses
Inventor
Gilbert Glossop
by Geo. P. Whittemore
Attorney
THE NORRIS PETERS CO., WASHINGTON, D. C.

No. 12,614. REISSUED MAR. 5, 1907.
G. GLOSSOP.
APPARATUS FOR MAKING AND SHARPENING ROCK DRILLS.
APPLICATION FILED AUG. 19, 1903.
3 SHEETS—SHEET 2.
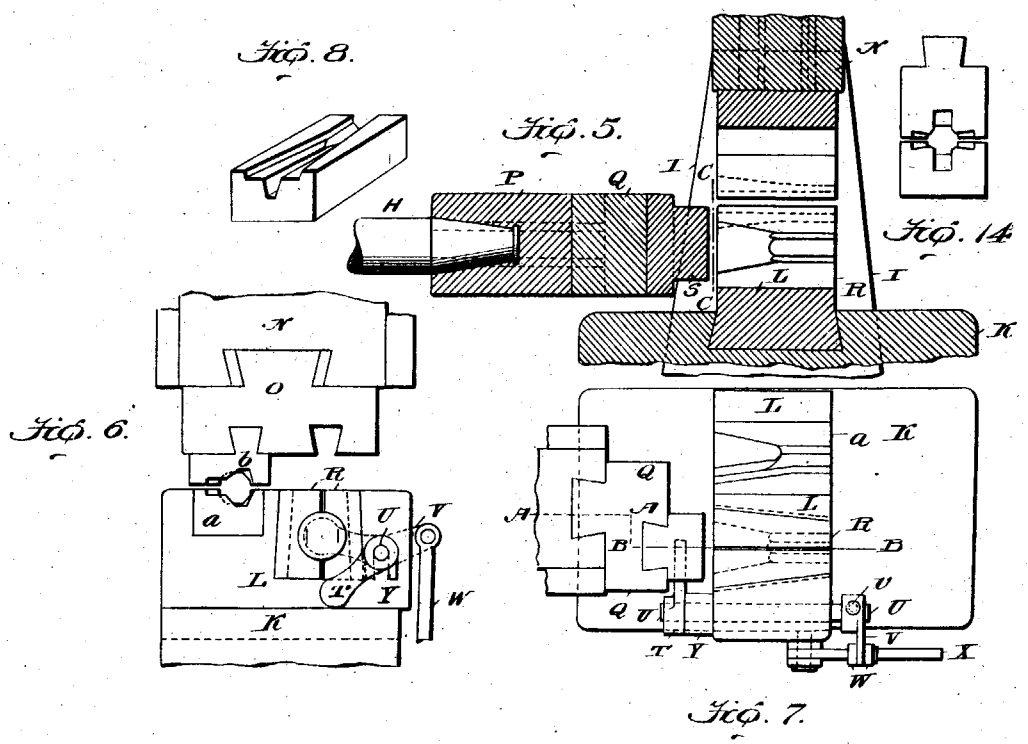
Witnesses
Inventor
Gilbert Glossop
by Geo. P. Whittlesey
Attorney
THE NORRIS PETERS CO., WASHINGTON, D. C.

No. 12,614. REISSUED MAR. 5, 1907.
G. GLOSSOP.
APPARATUS FOR MAKING AND SHARPENING ROCK DRILLS.
APPLICATION FILED AUG. 19, 1903.
3 SHEETS—SHEET 3.
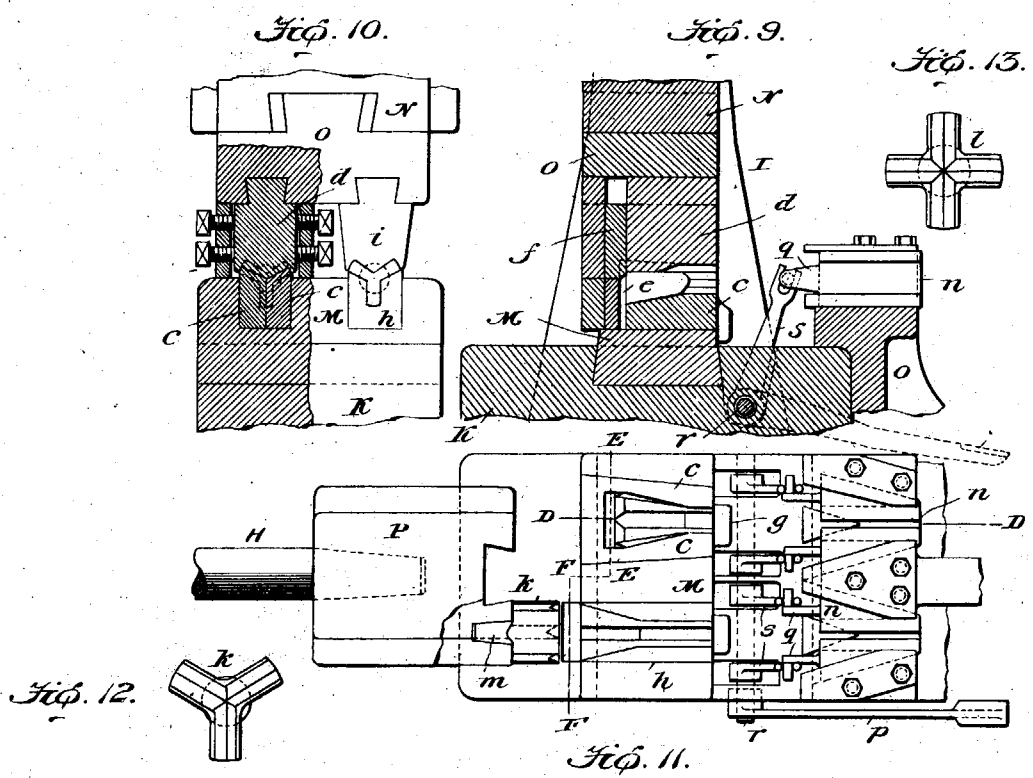
Witnesses
Geo. A. Stanbiss
Inventor
Gibert Glossop
by Geo. P. Whittlesey
Attorney
THE NORRIS PETERS CO., WASHINGTON, D. C.

UNITED STATES PATENT OFFICE.

GILBERT GLOSSOP, OF LEEDS, ENGLAND, ASSIGNOR OF ONE-HALF TO THOMAS HENRY BRADBURY, OF LEEDS, ENGLAND, AND ONE-HALF TO ANDREW MAKIE NIVEN, ROBERT NIVEN, AND JOHN WYLIE CRAIG NIVEN, OF JOHANNESBURG, TRANSVAAL.

APPARATUS FOR MAKING AND SHARPENING ROCK-DRILLS.

No. 12,614. Specification of Reissued Letters Patent. Reissued Mar. 5, 1907.

Original No. 661,798, dated November 13, 1900. Application for reissue filed August 19, 1903. Serial No. 170,099.

*To all whom it may concern:*

Be it known that I, GILBERT GLOSSOP, a subject of the King of Great Britain and Ireland, residing at the city of Leeds, England, have invented certain new and useful Improvements in Machinery or Apparatus for Making and Sharpening Rock-Boring Drills, of which the following is a specification.

The object of this invention is to provide machinery or apparatus whereby the making and sharpening of rock-boring drills have three or four chisel-pointed wings may be readily and accurately effected even by unskilled labor, and comprises two steam or compressed-air driven hammers arranged at right angles to each other with anvil-block and dies or tools fitted to the anvil-block and to the heads of the hammers for, first, jumping or swelling up the ends of the steel drill-bar, which is usually octagonal in section, by means of one hammer operating against the end of the bar, so as to form a conical head containing sufficient metal to form the wings; second, drawing and forming the conical head, by means of the other hammer operating on the sides of the bar, to a shape intermediate between the cone and the finished wings; third, forming the wings to proper size and shape by means of the latter hammer, and, fourth and lastly, sharpening the chisel-shaped ends of the wings by means of the end-operating hammer. The first two operations are intended to be performed at one heat and the last two operations at a second heat, these last two operations only being required in the case of drills sent from the mine to be resharpened.

In the following description reference is had to the accompanying drawings, of which—

Figure 1 is a longitudinal section, and Fig. 2 an end elevation with the cylinder in section, showing the general arrangement of the hammers and anvil, omitting details which do not form part of the invention claimed. Figs. 3 and 4 are perspective views of a three-winged and a four-winged rock-boring drill, respectively, as proposed to be made and sharpened by the machinery or apparatus herein described. Fig. 5 is a longitudinal section on line A A B B of Fig. 7. Fig. 6 is an elevation on line C C of Fig. 5, and Fig. 7 is a plan showing the dies or tools in position on the hammer-heads and anvil for jumping up the steel bar to form a conical head and afterward forming the conical head to the intermediate shape for a three-winged rock-drill. Fig. 8 is a perspective view of the die or tool for drawing and forming the conical head to the intermediate shape for a four-winged rock-drill. Fig. 9 is a longitudinal section on line D D of Fig. 11; Fig. 10, a section on line E E F F of Fig. 11, and Fig. 11 is a plan of the dies or tools in position on the hammer-heads and anvil for forming the wings to the finished shape and for sharpening the chisel ends and includes also means for assisting in holding the bar securely while these operations are being performed. Fig. 12 is a front view of the sharpening die or tool for a three-winged drill, and Fig. 13 of the sharpening tool or die for a four-winged drill. Fig. 14 is a front elevation of the forming dies or tools and of the holding dies or tools for a four-winged rock-drill.

In all the figures the same reference-letter refers to the same or corresponding part.

G indicates the piston-rod of the side-operating hammer, and H that of the end-operating hammer, while I indicates the side standards of the side-operating hammer.

K is the main anvil-block, formed with a dovetailed groove to receive the die or tool blocks L and M, which contain the dies or tools for performing the above-mentioned operations.

N is the head of the side-operating hammer, likewise provided with a dovetailed groove to receive the die or tool block O, while P is the head of the end-operating hammer, also provided with a dovetailed groove to receive the die or tool block Q.

R, Figs. 5, 6, and 7, is the anvil die or tool for forming the conical head and is made in halves which fit in a groove in the tool-block L, dovetailed or tapered both transversely and longitudinally, so that the halves of the die grip the steel bar during the upsetting operation or the forming of the conical head with a force proportioned to the blow of the end-operating hammer, the head of which latter carries a round or square upsetting-tool S, which is dovetailed into the tool-block Q.

T is a stop-lever secured on the rock-shaft

U, so that by means of the rock-arm V, link-rod W, and foot-lever X the stop-lever can be moved in front of the conical opening in the tool or die R and serves to fix the position of the steel bar in the tool or die R, so as to leave the necessary length projecting to provide sufficient metal to form the conical head. By using a thinner or thicker U-shaped sleeve Y and adjusting the position of the lever V on the rod U by means of the set-screw *v* the amount by which the end of the steel bar is made to project through the die R can be adjusted as required.

*a* and *b* are the dies for forming the cone to the intermediate shape. These are fitted, respectively, in the die-blocks L and O, the former in a rectangular and the latter in a dovetailed groove.

*c* and *d* are the tools or dies for forming the wings on the end of the steel bar to the proper shape and are fitted, respectively, in the die or tool blocks M and O. They are both provided with a rectangular slot at the front end to receive the beveled steel plates *e* and *f*, respectively, which serve to form the chisel-shaped ends of the wings. The steel plate *e* may be formed in halves, as shown, or in one piece. The tool or die *c* is formed tapered to fit a taper groove in the tool-block M and with a projecting lug *g* at the back, fitting against the back of the block M to prevent any tendency of the tool or die *c* to move lengthwise under the forming operation. The tool or die *d* is dovetailed in the die or tool block O.

*h* and *i* are holding tools or dies fitted, respectively, in the die-blocks M and O and serve to hold the drill with the chisel ends projecting so as to be acted upon by the sharpening-tool *k* for three-winged drills and *l* for four-winged drills, which fit, by means of a conical stem *m*, in a conical socket in the head P of the end-operating hammer.

The two wing-spaces left by the juxtaposition of the dies or tools *c* and *d* are narrower at the root or center than at the outside, so that the finished drill leaves a comparatively large space for the passage of debris from the end of the drill-hole during the drilling operation in the mine. As the drill has to be moved laterally when it is inserted or removed from the tool or die *c*, the wing-groove in the body of the die is made the same width throughout, and during the forming operation the drill-bar is several times rotated through one hundred and twenty degrees to insure that all the three wings are made thinner near the root or center than at the outside. This applies also to the holding die or tool *h*.

To assist in holding the drill during the last two operations, the gripping device shown in Figs. 9 and 11 is employed and bolted to the anvil-bed behind the anvil-block K. The device consists of a pair of split gripping-dies *n*, fitted in the tapered slides formed in the casting *o*, so that as they are drawn out they move apart and as they are pushed back they come together, in this latter case gripping the drill-bar tightly between them. The dies are moved forward and backward from the foot-lever *p* by means of the lugs *q*, shaft *r*, and rocking levers *s*.

The apparatus is used as follows: The heated end of the drill-bar is pushed through the cone-forming die or tool R, Figs. 5 to 7, against the stop-lever T, which is momentarily interposed to fix the position of the drill-bar with the proper length projecting. The stop-lever T is then removed and the end-operating hammer started and kept working until the upsetting die or tool S has caused the metal to fill the cone-hollow of the die or tool R. The hammer-head P is then drawn back and the halves of the die or tool R pushed forward until they gape sufficiently to allow the drill-bar to be lifted out, when the drill-bar is immediately placed with the cone-head over the front part of the adjoining tool or die *a*. The side-operating hammer is then set to work and kept working until the cone end is drawn and formed by the dies or tools *a* and *b* to the intermediate shape. This operation is repeated with as many drill-bars as are required. In the case of four-winged rock-drills being required the die or tool illustrated in Fig. 8 is substituted for the die *a* with a similar coöperating die or tool. The die or tool block L is then replaced by the die or tool block M, Figs. 9 to 11, fitted with the dies or tools *c* and *h*. The die or tool *b*, Fig. 6, is removed from the die or tool block O, and the dies or tools *d* and *i*, Fig. 10, are attached thereto. The die or tool block Q is removed from the hammer-head P, and the sharpening die or tool K, Figs. 11 and 12, is then fitted in the socket-hole *m* in the hammer-head P. The drill-bars from the last of the above-described operations or the blunted drills from the mine are heated, and the heated end of each drill-bar is first placed resting on the die or tool *c* and the hammer N then started working, during which the drill-bar is occasionally rotated through one hundred and twenty degrees, as otherwise the wing on the drill opposite the hammer instead of being narrower nearer the center would be of the same width throughout. The solid parts of the die or tool *c* and *d* form the bodies of the wings, while the beveled plates *e* and *f* point or form the chisel ends of the wings. When the wings are thus brought to the proper shape, or in the case of blunted drills from the mine have thus been drawn out to their original length and the chisel ends pointed, the wing end of the drill is then placed resting on the holding die or tool *h*, while the hammer-head N is brought, with the holding-die *i*, against the wings to assist in holding the drill. The hammer P is then set to work, and the sharpening tool or die *k* brings the chisel ends up to the proper degree of sharpness. The pointing or shaping of the chisel ends under the side-operating hammer and the sharpening by the end-operating hammer subsequently and at a consequently comparatively lower temperature overcome the difficulty often experienced when the chisel ends are formed or pointed in the first instance by a percussive action in the direction of the length of the drill, in that in the latter case the wings are usually jumped up or thickened instead of the metal being drawn out to a chisel-point.

In the case of four-winged drills the forming dies or tools *c* and *d* and the holding dies or tools *h* and *i* are replaced by others. (Shown in front elevation in Fig. 14.)

Having now described my invention, what I claim a new, and desire to secure by Letters Patent, is—

1. In a machine for treating drill-bars, the combination with an upsetting-hammer, of a tool-block having a groove tapered both transversely and longitudinally, and a die composed of halves and similarly tapered to fit said groove.

2. In a machine for treating drill-bars, the combination with suitable dies and means for operating them, of a gripping device for the drill-bar comprising stationary guides inclined toward each other, gripping-blocks movable in said guides, and means for actuating said blocks.

3. In a machine for treating drill-bars, a gripping device for the bar, comprising a hollow split gripping-block, tapered guides for the two parts of said block, a connecting-lug on each part, a rock-shaft provided with rock-arms engaging said lugs, and means for operating said shaft.

4. In machinery or apparatus for treating rock-drills, the combination of two hammers operating at right angles, and an anvil, the hammer-head N of one hammer having a wing drawing, forming and pointing die or tool *d* and a holding-die *i*, the hammer-head P of the other hammer having a wing-sharpening tool or die *k*, while the anvil-block is provided with a wing pointing, forming and drawing die *c* and a holding-die *h*, all substantially as herein set forth.

5. In machinery or apparatus for treating rock-drills, the combination of two hammers operating at right angles, an anvil, the hammer-head N of one hammer having a wing drawing and pointing die or tool *d* and a holding-die *i*, the hammer-head P of the other hammer having a wing-sharpening tool or die *k*, and the anvil-block being provided with a wing pointing, forming and drawing die *c* and a holding-die *h*, and of the double gripping device consisting of two hollow split taper gripping-blocks *n*, tapered guides or slides, connecting-lugs *q*, rocking levers *s*, shaft *r*, and foot-lever *p*, all substantially as herein set forth.

GILBERT GLOSSOP.

Witnesses:
L. H. BRADBURY,
CHAS. GILLIARD.